US008213350B2

(12) United States Patent
Courseille

(10) Patent No.: US 8,213,350 B2
(45) Date of Patent: Jul. 3, 2012

(54) COMMUNICATION NETWORK WITH RELAYING OF RADIO SIGNALS BY RELAY TERMINALS

(75) Inventor: Olivier Courseille, Auzeville (FR)

(73) Assignee: Alcatel Lucent, Paris (FR)

( * ) Notice: Subject to any disclaimer, the term of this patent is extended or adjusted under 35 U.S.C. 154(b) by 1217 days.

(21) Appl. No.: 11/571,809

(22) PCT Filed: May 18, 2005

(86) PCT No.: PCT/FR2005/050340
§ 371 (c)(1),
(2), (4) Date: Jul. 10, 2007

(87) PCT Pub. No.: WO2006/013294
PCT Pub. Date: Feb. 9, 2006

(65) Prior Publication Data
US 2008/0311904 A1    Dec. 18, 2008

(30) Foreign Application Priority Data
Jul. 8, 2004    (FR) .......................................... 045471

(51) Int. Cl.
*H04B 7/154*    (2006.01)
*H04J 1/10*    (2006.01)
*H04J 3/08*    (2006.01)

(52) U.S. Cl. ........ 370/315; 370/316; 370/317; 370/326; 455/7; 455/10; 455/11.1; 455/12.1; 455/13.1

(58) Field of Classification Search .................. 455/427, 455/11.1, 12.1, 13.1, 13.2, 7, 10, 225; 370/315, 370/316, 317, 326
See application file for complete search history.

(56) References Cited

U.S. PATENT DOCUMENTS

| 6,473,617 | B1 | 10/2002 | Larsen |
| 6,785,510 | B2 * | 8/2004 | Larsen .......................... 455/11.1 |
| 6,879,574 | B2 * | 4/2005 | Naghian et al. ............... 370/338 |
| 6,944,139 | B1 * | 9/2005 | Campanella ................... 370/315 |
| 7,092,434 | B2 * | 8/2006 | Moon et al. .................... 375/211 |
| 7,224,936 | B2 * | 5/2007 | Pearson ....................... 455/11.1 |
| 7,649,872 | B2 * | 1/2010 | Naghian et al. ............... 370/338 |
| 2001/0012776 | A1 * | 8/2001 | Chandler et al. .............. 455/435 |
| 2003/0068975 | A1 * | 4/2003 | Qiao et al. .................... 455/11.1 |

FOREIGN PATENT DOCUMENTS

| GB | 2 326 059 A | 12/1998 |
| GB | 2 346 511 A | 8/2000 |
| WO | WO 01/58042 A1 | 8/2001 |
| WO | WO 02/080405 A1 | 10/2002 |

* cited by examiner

*Primary Examiner* — Kent Chang
*Assistant Examiner* — Magdi Elhag
(74) *Attorney, Agent, or Firm* — Fay Sharpe LLP

(57) ABSTRACT

A radiocommunication network includes at least one communication station (GW) adapted to exchange data by radio with radiocommunication terminals (T1-T5). This network is adapted to use a data transmission method wherein, each time a source radiocommunication terminal (T1) wishes to transmit data to its communication station (GW), the identifier of at least one active neighbor relay communication terminal (T2, T3) is determined in the source terminal (T1) in order to transmit signals representing the data to be transmitted by radio to each relay terminal so determined so that it relays them to the communication station (GW).

25 Claims, 2 Drawing Sheets

COMMUNICATION NETWORK WITH RELAYING OF RADIO SIGNALS BY RELAY TERMINALS

CROSS-REFERENCES

Figure 1:
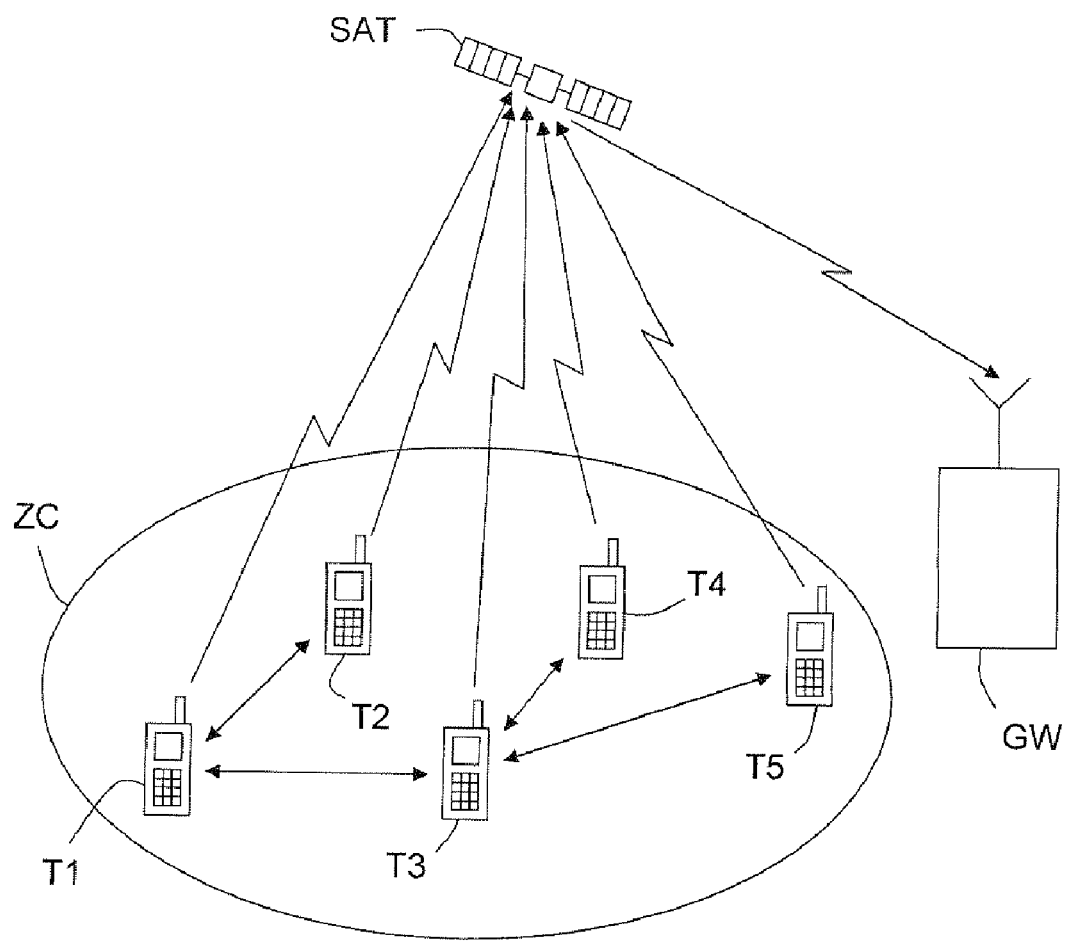

This application claims the benefit of French Application No. 0451471, filed Jul. 8, 2004 and is a U.S. National Stage Entry of International Application No. PCT/FR2005/050340, filed May 18, 2005.

The invention concerns the field of radiocommunication networks, and more precisely the transmission of data between radiocommunication terminals, generally mobile terminals, and a communication station of such a network.

In a radiocommunication network uplink and downlink calls between the communication terminals and the communication stations (such as for example a base station (BTS or Node B) of a GSM or UMTS network or a satellite station (or gateway)) are of good quality only if the propagation conditions are favorable. Now, this situation is relatively infrequent if mobile communication terminals are placed in areas including obstacles, such as for example in urban environments.

In the case of a satellite network, the situation is more critical because communication between the satellite terminals and the satellite that covers them is effected by means of direct links. Communications can therefore be of good quality only if the satellite is preferably directly visible from the satellite terminal concerned. This drawback is unfortunately not compensated by the fact that the transmission power of a satellite terminal is greater than that of a terrestrial mobile terminal and that it has a larger antenna. It is even aggravated because the satellites have transmission powers limited to a few kilowatts, because of their limitation in terms of size and weight.

The invention therefore has the object of improving on the situation in radiocommunication networks, especially when they are of satellite type.

It proposes to this end a data transmission method wherein, each time a source radiocommunication terminal wishes to transmit data to its communication station, the identifier of at least one active neighbor relay communication terminal is determined in that source terminal, in order to transmit to each relay terminal so determined, by radio, signals representing the data to be transmitted so that it relays them to the communication station.

The method according to the invention may have complementary features and in particular, separately or in combination:

there may be determined in the source terminal the identifiers of at least two relay terminals, so as to transmit by radio to each of them the signals representing the data to be transmitted, so that each relays those signals to the communication station, the source terminal may also transmit the signals representing the data to the communication station, there may be determined in at least one of the relay terminals the identifier of at least one active neighbor relay terminal so as to transmit by radio to each relay terminal so determined the signals representing the data so that it relays them also to the communication station, the received signals representing the data may be combined in the communication station before processing them locally, to increase the total energy received associated with the transmitted data and thereby to improve reception quality, if the network is of the satellite type may be combined in the communication satellite of the network (responsible for relaying signals between the terminals and the communication station) the signals received from the relay terminals associated with the same source terminal and representing identical data, in order to relay to the communication station combined signals representing the data (and having increased energy), on reception of signals to be relayed the relay terminal may be configured as a relay before proceeding to relay the signals, the source terminals may be mobile terminals and may act as relay terminals, at least one of the relay terminals may be a fixed terminal (in view from the satellite at all times if it is of the satellite type) dedicated to relaying signals representing data to be transmitted.

The invention also proposes a data transmission method wherein, each time data is to be transmitted to a destination radiocommunication terminal, the identifier of at least one neighbor relay terminal is determined in the destination terminal in order to transmit by radio to each relay terminal so determined the signals representing the data so that it relays them to the destination terminal.

This method according to the invention can have complementary features and in particular, separately or in combination:

the destination terminal may also receive directly from the communication station the signal representing the data, and where applicable combine it with those received from the relay terminals, if it is adapted accordingly, if data is to be transmitted to a destination communication terminal via a satellite, the identifier of at least one neighbor relay terminal of the destination terminal may be determined in the satellite in order to transmit by radio to each relay terminal so determined signals representing the data to be transmitted so that it relays them to the destination terminal, the destination terminal may also receive the signal representing the data directly from the satellite, the identifier of at least one active neighbor relay terminal may be determined in at least one of the relay terminals in order to transmit by radio to each relay terminal so determined the signals representing the data so that it relays them also to the destination terminal, the received signals representing the data may be combined in the destination terminal before processing them locally in order to increase the total energy received associated with the transmitted data and thereby to improve reception quality, the received signals representing the data may be combined in each relay terminal in order to relay to the destination terminal, where applicable via at least one other neighbor relay terminal, signals resulting from this combination representing the data (and having increased energy), on reception by the relay terminal of signals to be relayed, it may be configured in relay mode before proceeding to relay the signals, the destination terminals may be mobile terminals and may act as relay terminals, at least one of the relay terminals may be a fixed communication terminal (in view from the satellite at all times if it is of the satellite type) dedicated to relaying signals representing data to be transmitted.

The invention further proposes a communication terminal (where applicable of the satellite type) comprising management means adapted if data is to be transmitted to the communication station (where applicable via a satellite) to determine the identifier of at least one relay terminal and to instruct the transmission by radio to each relay terminal so determined of signals representing the data so that they are relayed to the communication station.

The terminal according to the invention may have complementary features and in particular, separately or in combination:

its management means may be adapted to instruct the transmission by radio of the signals representing the data to the communication station, processing means adapted to combine the signals received from the relays representing data coming from the communication station before the data is processed locally, configuration means adapted, on reception of signals to be relayed, to configure local transmission means in relay mode so that they relay the received signals to at least one neighbor relay terminal or to a destination terminal; in this case, the processing means may be adapted, when the transmission means are configured in relay mode, to combine the receive signals representing data to be relayed before authorizing relaying thereof with increased energy; here the terminal may therefore act as a relay.

The invention further proposes a communication satellite comprising processing means adapted to combine received signals representing identical data to be relayed to its communication station (which is then of the satellite type) before authorizing relaying thereof with increased energy.

This satellite may equally comprise management means adapted if data is to be transmitted to a destination terminal to determine the identifier of at least one neighbor relay terminal of that destination terminal and then to instruct local transmission means to transmit by radio to each relay terminal so determined signals representing the data so that it relays them to the destination terminal and/or to at least one other relay terminal.

The invention further proposes a communication station (where applicable of the satellite type) comprising processing means adapted to combine received signals representing identical data coming from at least one relay radiocommunication terminal and where applicable from a source terminal before the data is processed locally.

Figure 2:
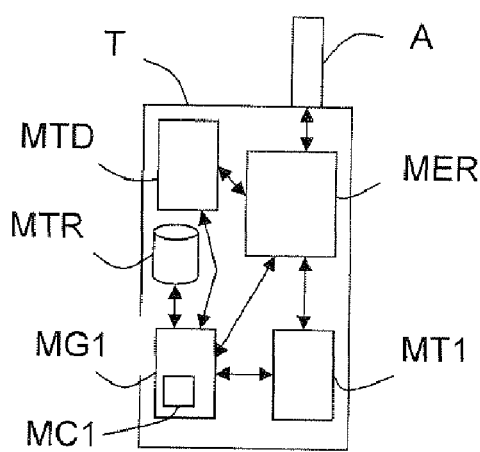
Figure 3:
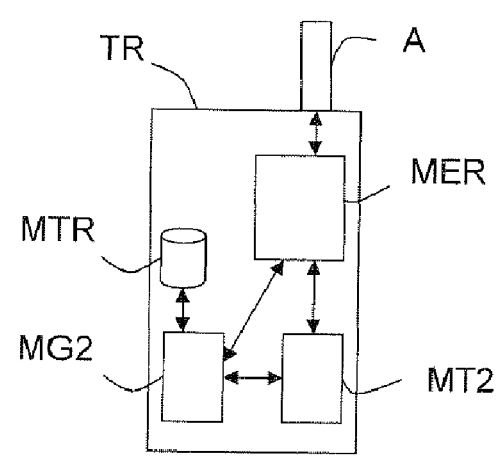
Figure 4:
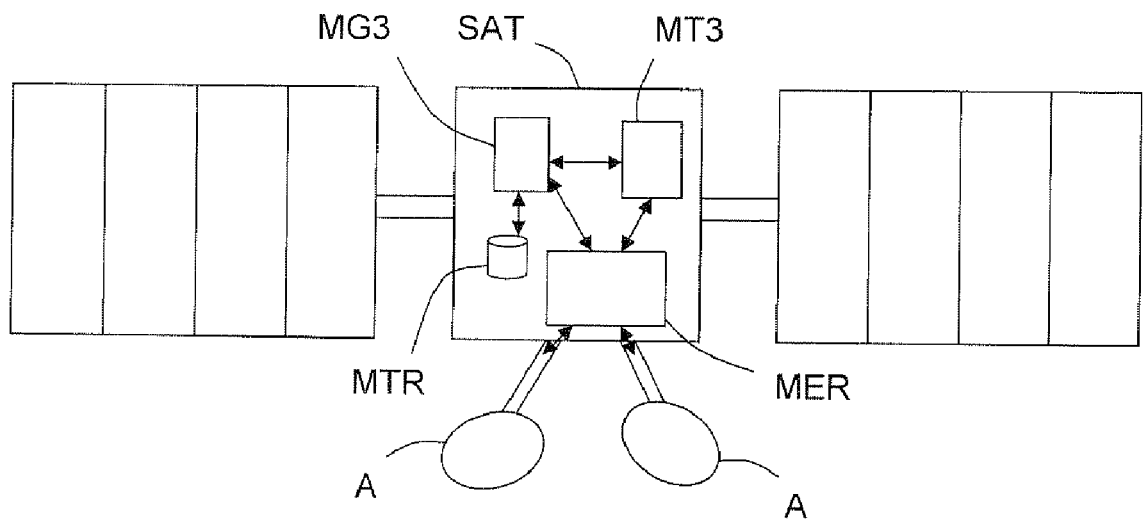
Figure 5:
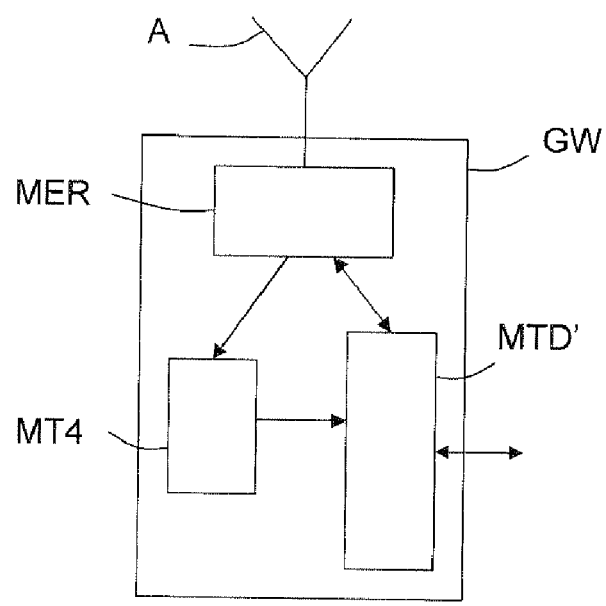

Other features and advantages of the invention will become apparent on examining the following detailed description and the appended drawings, in which:

FIG. 1 shows diagrammatically a portion of a satellite communication network,

FIG. 2 shows diagrammatically and functionally one embodiment of a mobile satellite communication terminal according to the invention suitable for use as a relay station, FIG. 3 shows diagrammatically and functionally one embodiment of a fixed satellite communication terminal according to the invention dedicated to the relay function, FIG. 4 shows diagrammatically and functionally one embodiment of a communication satellite according to the invention, and FIG. 5 shows diagrammatically and functionally one embodiment of a satellite station according to the invention.

The appended drawings constitute part of the description of the invention as well as contributing to the definition of the invention, if necessary.

An object of the invention is to improve communication quality in radiocommunication networks and especially in satellite type networks.

It is considered hereinafter by way of nonlimiting example that the network is of the satellite type. However, the invention is not limited to that type of network. It concerns equally cellular radio networks, such as for example those of the GSM/GPRS, UMTS or Ad-hoc type.

Here "satellite network" means not only a satellite-only network, i.e. one in which uplink and downlink communications between the satellite communication terminals and the core network are effected only through the intermediary of one or more satellites, but also a hybrid network, i.e. one in which uplink or downlink communications between the core network and the satellite communication terminals are effected through the intermediary of one or more satellites and one or more terrestrial repeaters (some of which possibly constitute base stations of a cellular radio network, for example of the GSM/GPRS or UMTS type). For example, exclusively satellite networks are of the Inmarsat, Globalstar or Thuraya type and the hybrid network is of the SDMB (Satellite Digital Multimedia Broadcast) type.

It is considered hereinafter by way of nonlimiting example that the network is a satellite-only network.

Moreover, "satellite communication terminal" here means any user equipment, such as a mobile or fixed telephone, a fixed or portable computer or a personal digital assistant (PDA) equipped with satellite communication means. It is considered hereinafter by way of illustrative and nonlimiting example, and unless explicitly indicated otherwise, that the satellite communication terminals are mobile telephones.

FIG. 1 is referred to first of all to describe a satellite network, in broad terms but nevertheless in sufficient detail for an understanding of the invention.

A satellite network includes at least one satellite transmission station (or gateway) GW installed on the ground at a selected location and connected to the core network (not shown) and at least one communication satellite SAT for relaying signals that it receives from the gateway GW to the mobile telephones Ti (here i=1 to 5, but may take any value) that are situated in its coverage area ZC, as well as the signals that it receives from the mobile telephones Ti via the gateway GW.

For example, if the network uses a W-CDMA type radio interface, the gateway GW encodes data to be transmitted to a mobile telephone T using a channelization code (or pseudorandom code) associated with the physical downlink transmission channel and belonging to a sequence of mutually orthogonal channelization codes, and then modulates a carrier at frequency F0 with the encoded data, spectrally spreading the modulated carrier using a spreading code associated with the sequence, and finally transmitting the spread carrier by radio to the satellite SAT to which it is coupled, in the form of signals called "carrier frequency signals". On reception of those signals, the satellite SAT transposes the frequency F0 of the carrier to a frequency F1 and retransmits by radio transposed frequency signals to the mobile telephone(s) Ti to which the data is addressed.

To improve communication quality in the satellite network, in particular in the presence of obstacles in a coverage area ZC, the invention proposes to use the mobile telephones Ti in particular to relay the radio signals coming from a source mobile telephone or from the gateway GW. In other words, in the example described, the invention proposes to combine satellite and ad hoc type communications.

More precisely, the invention proposes a data transmission method consisting in determining in a source mobile telephone, for example the mobile telephone T1, requiring to transmit data to the gateway GW, the identifier of at least one active neighbor terminal, called the relay terminal, for example the terminals T2 and T3, in order to transmit to it or to each of them by radio signals representing the data to be transmitted so that it or they relay(s) the data to the satellite SAT.

Here "active satellite terminal" means a fixed or mobile satellite communication terminal ready to transmit data because it is on standby or turned on, in contrast to an inactive terminal, which is turned off.

According to the invention, such an active satellite terminal may be, for example, a mobile telephone or a fixed satellite communication terminal TR dedicated exclusively to the relaying of signals coming either from a source mobile telephone T1 and addressed to the gateway GW, where applicable via at least one other active satellite terminal, and via the satellite SAT, or from the gateway GW, via the satellite SAT, and addressed to a destination mobile telephone Ti, where applicable via at least one other active satellite terminal.

The relay terminal identifier(s) may be determined by means of a table of relay terminals stored in each mobile telephone Ti. Because of the mobility of the mobile telephones Ti, their tables are preferably updated regularly, for example periodically. To this end the mobile telephones Ti and any fixed relay terminals may exchange signaling messages signaling their presence, and where applicable the presence of their active neighbors, for example. As a result, the mobile telephones Ti have reliable neighbor information.

The source telephone (here T1) that solicits the relaying of its data via the relay terminals (here the terminals T2 and T3) can also attempt to transmit its data directly, in the form of signals, to the satellite SAT that covers the coverage area ZC in which it is situated.

As indicated hereinabove, each relay terminal T2, T3 determined by the source telephone T1 relays signals that it receives from said source telephone T1. To this end a procedure may be provided for configuring the relay terminal T2, T3 in relay mode as soon as it receives signals to be relayed and, of course, if it is not already busy with some other task, or if it still has sufficient electrical power to effect this operation without compromising its own operation. If the information contained in the table of terminals allows it, the source telephone T1 preferably determines at least two identifiers of relay terminals to which it is going to transmit signals comprising identical data (or echoes).

Once configured in relay mode, the relay terminals T2, T3 retransmit the received signals to the satellite SAT. However, it may equally be envisaged that each relay terminal, like the source telephone T1, determines at least one other relay terminal in order to retransmit the signals to it for it likewise to relay them. In this case, the relay terminal must have a table of relay terminals, which is the case if it is a mobile telephone.

In the example shown in FIG. 1, the relay terminal T3 has determined from its table that the relay terminals T4 and T5 are neighbors and active, and so has retransmitted the signals that it has received to them in order for them to relay them to the satellite SAT. The use of the terminals T4 and T5 is, for example, signaled to the source terminal T1 so that it can manage (where applicable limit) the number of relay terminals used for the relay transmission.

The object of the multiple retransmission of signals comprising identical data is in fact to enable improvement of communication quality because of the increased energy (or level) that these signals, comprising identical data, have once they have been combined. It can in fact be shown that the improvement resulting from retransmission from n relay terminals is of the order of $10*\log(n)$ dB, n being the number of relay terminals from which signals comprising identical data are actually received.

The signals sent by the terminals can be combined either in the satellite SAT or in the gateway GW.

In the former case, as soon as the satellite SAT has received signals representing data from a relay terminal or from a source telephone, it aligns temporally any signals comprising identical data (called echoes) retransmitted by one or more other relay terminals. The satellite SAT then combines (in amplitude and phase) the signals comprising the identical data (or echoes) before retransmitting to the gateway GW (where applicable after frequency transposition in the case of a W-CDMA interface) a combined signal having an increased (summed) energy. The gateway GW then receives this combined signal, which facilitates processing and greatly improves communication quality.

In the latter case, the satellite SAT merely relays signals that it receives from the relay terminals (here the terminals T2 to T5) and where applicable from the source telephone T1 (where applicable after a frequency transposition). As soon as the gateway GW receives signals representing data, it waits during a chosen time slot to collect any signals comprising identical data (called echoes) retransmitted by one or more relay terminals and where applicable the source telephone T1 via the satellite SAT. It then combines the signals comprising identical data (or echoes) in amplitude and phase. This processing is therefore greatly facilitated and uplink communication quality is greatly improved because of the increased energy.

The invention can also improve downlink communication quality. In fact, it also proposes a method whereby, if the gateway GW wishes to transmit (here via the satellite SAT) data to a destination mobile telephone Tj (here j=1 to 5), the latter determines the identifier of at least one neighbor relay terminal Tk (here k=1 to 5) or TR of the destination telephone Tj in order to transmit to it by radio signals comprising identical data (or echoes) representing the data to be transmitted so that it relays that data to the destination telephone Tj.

To this end, each terminal Tk also has a table of destination terminals Tj for which it can serve as a relay. That table is updated regularly, for example periodically, by means of signaling messages transmitted by the mobile telephone Ti and where applicable by the fixed relay terminals TR.

If the information contained in the table of relay terminals allows it, each destination terminal preferably determines at least two identifiers of relay terminals Tk or TR that will transmit to it signals comprising identical data (or echoes).

The destination terminal Tj, which solicits the relaying of the signals comprising identical data (or echoes) by the relay terminals Tk or TR, can also receive directly the signals (or echoes) coming (here) from the satellite SAT.

It may also be envisaged that the satellite SAT also has a table of relay terminals, which it updates regularly, for example periodically, by means of signaling messages transmitted by the mobile telephones Ti and where applicable the fixed relay terminals TR. If the information contained in the table of relay terminals allows it, the satellite SAT preferably determines at least two identifiers of relay terminals Tk or TR to which it will transmit signals comprising identical data (or echoes).

The satellite SAT, which solicits the relaying of the signals comprising identical data (or echoes) by the relay terminals Tk or TR, may also attempt to transmit the signals (or echoes) directly to the destination telephone, in particular if the (downlink) link with that destination terminal Tj is of good or average quality.

Of course, each relaying by a relay terminal may necessitate placing the latter first in a relay mode when it receives the signals to be relayed (if it is not already busy with some other task).

When the destination telephone Tj has received from a relay terminal Tk or TR or from the satellite SAT signals representing data, it waits during a chosen time slot to collect any signals comprising identical data (called echoes) retransmitted by one or more other relay terminals. It then combines the signals comprising identical data (or echoes) (in phase and amplitude) before processing them locally. This processing is therefore greatly facilitated and downlink communication quality greatly improved because of the increased (summed) energy. The terminal may also limit itself to choosing only the signal of highest quality.

It may equally be envisaged that each relay terminal Tk or TR waits during a chosen time slot to collect any signals comprising identical data (called echoes) retransmitted by the other relay terminal. It then combines (in amplitude and phase) the signals comprising identical data (or echoes) before retransmitting the combined signal having the increased (summed) energy to the destination terminal Tj, where applicable via at least one other neighboring relay terminal.

To implement the methods according to the invention, mobile telephones of the type shown in FIG. 2 may be used, for example.

More precisely, the mobile telephone T shown comprises firstly a transceiver module MER coupled to a transmit/receive antenna A for generating the signals representing the data to be transmitted that is supplied to it by a data transmission module MTD (comprising the microphone, for example) and receiving the signals coming from the gateway GW via the satellite SAT and the relay terminals Tk or TR.

It equally comprises a management module MG1 responsible for observing the output of the data generation portion of the data transmission module MTD, for example. Thus each time that data must be transmitted, the management module MG1 determines in a memory MTR containing the table of relay terminals the identifiers of the relay terminals Tk or TR to which must be transmitted the signals comprising identical data (or echoes) representing said data. This management module MG1 also instructs the transceiver module MER to generate the signals and their echoes and to transmit them to the satellite SAT and to each relay terminal Tk or TR that has been determined. To this end it supplies it with the identifier of each relay terminal Tk or TR that it has determined in the memory MTR.

Moreover, the mobile telephone T may also include a processing module MT1, supplied by the transceiver module MER with signals received from the satellite SAT and from the relay terminals, for combining those signals (in phase and amplitude) so that they can be processed internally.

As indicated hereinabove, the mobile telephone T is preferably adapted also to relay signals that it receives to the satellite SAT and/or to one or more other relay terminals TR. In this case, its management module MG1 preferably comprises a configuration submodule MC1 for configuring the transceiver module MER in relay mode when the latter receives new signals to be relayed.

As also indicated hereinabove, the network may include fixed relay terminals, i.e. terminals dedicated exclusively to relaying signals (or echoes). Such a fixed relay terminal TR is shown by way of example in FIG. 3. It is substantially identical from the functional point of view to a mobile telephone Ti of the type described hereinabove with reference to FIG. 2.

In fact, it differs from the latter in that it is designed neither to generate data to be transmitted, for example in cooperation with a microphone, or to process received data, for example to deliver them to a loudspeaker. It therefore essentially includes a simplified transceiver module MER that is dedicated to relaying signals received by its antenna A, where applicable a management module MG2 coupled to a memory MTR, if it is also responsible for determining other relay terminals, and where applicable with a processing module MT2 for combining (in amplitude and phase) received signals comprising identical data.

Moreover, for signals transmitted on the uplink channel, if the satellite SAT is responsible for combining (in amplitude and phase) signals comprising identical data, said satellite SAT may be as shown in FIG. 4.

More precisely, in the embodiment shown in FIG. 4, the satellite SAT comprises in addition to its usual functional modules, such as in particular its transceiver module MER coupled to its antenna(s) A, a processing module MT3 for combining (in amplitude and phase) signals comprising identical data received from the mobile telephones Ti and where applicable from the fixed relay terminals TR, as described hereinabove, and then instructing the transceiver module MER to transmit them to the gateway GW with increased (summed) energy. In this case, the gateway GW is of standard type.

For the signals transmitted on the downlink channel, the satellite SAT may include a management module MG3, coupled at least to the transceiver module MER, for observing the (downlink) signals received by the latter. Thus each time that downlink signals must be transmitted to a destination telephone Tj (here situated in the coverage area ZC of its satellite SAT), the management module MG3 determines in a memory MTR containing the table of the relay terminals of the coverage area ZC, the identifiers of the relay terminal Tk or TR to which the signals comprising identical data (or echoes) must be transmitted. This management module MG3 also instructs the transceiver module MER to generate the signals and their echoes in order to transmit them to the destination telephone Tj and to each relay terminal Tk or TR that has been determined. To this end it supplies it with the identifier of each relay terminal that it has determined in the memory MTR.

If the signals comprising identical data sent by the terminals are combined in the gateway GW, the satellite SAT is of standard type and merely retransmits to it all of the signals that it receives from the mobile telephones Ti and any fixed relay terminals TR. To this end, the gateway GW may be as shown in FIG. 5.

More precisely, in the embodiment shown in FIG. 5, the gateway GW comprises in addition to its usual functional modules, such as in particular its transceiver module MER coupled to its antenna A, a processing module MT4 for combining (in amplitude and phase) the signals comprising identical data received from the mobile telephones Ti and from any fixed relay stations TR, via the satellite SAT, as described hereinabove. The processing module MT4 then communicates the combined signals to the data processing module MTD' to which it is coupled in order for it to process the data that they represent.

The various processing modules MT1 to MT4, the various management modules MG1 to MG3 and the various configuration modules MC1 to MC3 may be produced in the form of electronic circuits, software (or electronic data processing) modules, or a combination of circuits and software.

The invention is not limited to the communication terminal (where applicable satellite terminal), fixed relay terminal, communication satellite, communication station (where applicable satellite station) and data transmission method embodiments described hereinabove by way of example only, but encompasses all variants that the man skilled in the art may envisage that fall within the scope of the following claims.

Thus there is described hereinabove the use of the invention in a satellite type network. However, the invention concerns equally cellular radio networks, such as those of the GSM/GPRS and UMTS type, for example. In this case, firstly, the communication stations are no longer gateway type satellite stations, but base stations, such as Nodes B or BTS, for example, secondly, the radiocommunication terminals are no longer necessarily of satellite type, and, thirdly, communications between the communication station and the radio terminals are no longer effected via a communication satellite (the signals are therefore relayed by the relay terminals between the (source or destination) radio terminals and the base station).

Moreover, there is described hereinabove a use of the invention in networks in which signals could be relayed on uplink transmissions and downlink transmissions. However, the invention applies equally to networks in which signals are relayed only on uplink transmissions or only on downlink transmissions.

The invention claimed is:

1. A method for data transmission in a radio communication network with respect to a source terminal adapted to transmit a radio signal carrying data to a communication station, the method comprising:
   a) at a source terminal, determining an identifier of at least one relay terminal associated with the radio communication network, wherein the at least one relay terminal is capable of relaying radio signals transmitted by the source terminal to the communication station;
   b) at the source terminal, selecting the at least one relay terminal for relaying a radio signal from the source terminal to the communication station; and
   c) transmitting data carried by the radio signal from the source terminal directly to the communication station and from the source terminal to the communication station via the at least one relay terminal;
   wherein the radio signals transmitted in c) are received at said communication station and combined in the communication station to form a combined signal having increased energy in relation to the individual radio signals transmitted in c).

2. Method according to claim 1, further comprising:
   d) performing a) through c) for at least two relay terminals.

3. Method according to claim 2, wherein two or more relay terminals to which the radio signal is transmitted in c) and d) determine an identifier of at least one other relay terminal to which the two or more relay terminals relay the corresponding radio signal such that at least some radio signals transmitted in c) and d) are transmitted from the source terminal to the communication terminal via the two or more relay terminals and the at least one other relay terminal.

4. Method according to claim 1, wherein at least one of said source terminal and one or more of said at least one relay terminal are mobile communication terminals.

5. Method according to claim 1, wherein one or more of the at least one relay terminal is a fixed terminal dedicated to relaying the radio signal carrying data transmitted in c).

6. The method according to claim 1 wherein the transmitting in c) directly from the source terminal to the communication station is via a communication satellite such that a first portion of radio signals transmitted in c) is via the communication satellite and wherein one or more relay terminal to which the radio signal is transmitted in c) relay the corresponding radio signal from the source terminal to the communication satellite such that a second portion of radio signals transmitted in c) is via the one or more relay terminal and the communication satellite.

7. Method according to claim 6, wherein the first and second portions of radio signals transmitted in c) are received at the communication satellite and combined in said communication satellite to form a combined signal in order to relay the combined signal to said communication station, the combined signal having increased energy in relation to the individual radio signals in the first and second portions of radio signals received by the communication satellite.

8. The method according to claim 2 wherein the radio signals transmitted in c) and d) are received at the communication station and combined in the communication station to form a combined signal having increased energy in relation to the individual radio signals transmitted in c) and d).

9. The method according to claim 3 wherein a first portion of the radio signals transmitted in c) and d) via the at least one other relay terminal are received at a first other relay terminal and combined in the first other relay terminal to form a combined signal in order to relay the combined signal to the communication station, the combined signal having increased energy in relation to the individual radio signals in the first portion of radio signals received by the first other relay terminal.

10. A method for data transmission in a radio communication network with respect to a communication station adapted to transmit radio signals carrying data to a destination terminal, the method comprising:
    a) at a communication station, determining an identifier of at least one relay terminal associated with the radio communication network, wherein the at least one relay terminal is capable of relaying radio signals transmitted by the communication station to the destination terminal;
    b) at the communication station, selecting the at least one relay terminal for relaying a radio signal from the communication station to the destination terminal; and
    c) transmitting data carried by the radio signal from the communication station directly to the destination terminal and from the communication station to the destination terminal via the at least one relay terminal;
    wherein the radio signals transmitted in c) are received at said destination terminal and combined in the destination terminal to form a combined signal having increased energy in relation to radio signal transmitted in c).

11. The method according to claim 10 wherein the transmitting in c) from the communication station to the destination terminal is via a communication satellite such that the communication satellite is capable of relaying the radio signal transmitted in c) from the communication station via the communication satellite directly to the destination terminal and from the communication station to the destination terminal via the communication satellite and the at least one relay terminal.

12. Method according to claim 11, wherein the identifier of the at least one relay terminal determined in a) is determined in said communication satellite rather than the communication station and the at least one relay terminal selected in b) is selected by the communication satellite rather than the communication station.

13. Method according to claim 10, further comprising: d) performing a) through c) for at least two relay terminals.

14. The method according to claim 13 wherein the radio signals transmitted in c) and d) are received at the destination terminal and combined in the destination terminal to form a combined signal having increased energy in relation to the individual radio signals transmitted in c) and d).

15. Method according to claim 13, wherein two or more relay terminals to which the radio signal is transmitted in c) and d) determine an identifier of at least one other relay terminal to which the two or more relay terminals relay the corresponding radio signal such that at least some radio signals transmitted in c) and d) are transmitted from the communication station to the destination station via the two or more relay terminals and the at least one other relay terminal.

16. Method according to claim 15, wherein a first portion of the radio signals transmitted in c) and d) via the at least one other relay terminal are received at a first other relay terminal and combined in the first other relay terminal to form a combined signal in order to relay the combined signal to said destination terminal, the combined signal having increased energy in relation to the individual radio signals in the first portion of radio signals received by the first other relay terminal.

17. Method according to claim 10, wherein one or more of the at least one relay terminal is a fixed terminal dedicated to relaying the radio signals carrying data transmitted in c).

18. A communication terminal in a radio communication network and adapted to exchange data carried by radio signals with a communication station, the communication terminal comprising:
   a management module to recognize outgoing data is to be transmitted to a communication station via a radio communication network and to determine an identifier of at least one relay terminal associated with the radio communication network, wherein the at least one relay terminal is capable of relaying radio signals transmitted by the communication terminal to the communication station, wherein the management module selects the at least one relay terminal for relaying a first radio signal from the communication terminal to the communication station;
   a transceiver module in operative communication with the management module to transmit outgoing data carried by the first radio signal from the communication terminal directly to the communication station and from the communication terminal to the communication station via the at least one relay terminal, wherein the transceiver module also receives incoming data carried by a second radio signal from the communication station directly and from the communication station via one or more relay terminal; and
   a processing module in operative communication with the transceiver module to combine the second radio signal carrying the incoming data received directly from said communication station and the second radio signal received from the communication station via the one or more other relay terminal to produce a combined signal that has increased energy in relation to the individual radio signals received by the transceiver module.

19. The communication terminal according to claim 18 wherein the second radio signal received directly from the communication station is received via a communication satellite such that the communication satellite is capable of relaying the second radio signal from the communication station directly to the communication terminal and from the communication station to the communication terminal via the one or more relay terminal.

20. The communication terminal according to claim 18, wherein the first radio signal carrying the outgoing data transmitted directly from the communication terminal to the communication station is via a communication satellite such that a first portion of the first radio signals carrying the outgoing data is transmitted via the communication satellite and wherein one or more relay terminal to which the first radio signal carrying the outgoing data is transmitted relay the corresponding first radio signal from the communication terminal to the communication satellite such that a second portion of the first radio signals carrying the outgoing data is transmitted via the one or more relay terminal and the communication satellite.

21. A communication satellite in a satellite communication network and adapted to facilitate exchange of data carried by radio signals between a communication station and a communication terminal, the communication satellite comprising:
   a management module to recognize station data is to be transmitted from a communication station to a communication terminal via a satellite communication network and to determine an identifier of at least one relay terminal associated with the satellite communication network, wherein the at least one relay terminal is capable of relaying radio signals transmitted by the communication station from the communication satellite to the communication terminal, wherein the management module selects the at least one relay terminal for relaying a first radio signal from the communication satellite to the communication terminal;
   a transceiver module in operative communication with the management module to receive station data carried by the first radio signal from the communication station and transmit station data carried by the first radio signal from the communication satellite directly to the communication terminal and from the communication satellite to the communication terminal via the at least one relay terminal, wherein the transceiver module also receives terminal data carried by a second radio signal from the communication terminal directly and from the communication terminal via one or more relay terminal; and
   a processing module in operative communication with the transceiver module to combine the second radio signal received directly from the communication terminal and the second radio signal received from the one or more relay terminal to produce a combined signal that has increased energy in relation to the individual radio signals received by the transceiver module;
   wherein the transceiver module transmits the combined signal to the communication station.

22. A first relay terminal in a radio communication network and adapted to facilitate exchange of data carried by radio signals between a communication station and a communication terminal, the first relay terminal comprising:
   a management module to recognize station data is to be transmitted from a communication station to a communication terminal via a radio communication network and to determine a first identifier of at least one second relay terminal associated with the radio communication network, wherein the at least one second relay terminal is capable of relaying radio signals to the communication terminal that are transmitted by the communication station to the first relay terminal, wherein the management module also determines a second identifier of at least one third relay terminal associated with the radio communication network, wherein the at least one third relay terminal is capable of relaying radio signals to the first relay terminal that are transmitted by the communication station to the communication terminal via the first relay terminal, wherein the management module also recognizes terminal data is to be transmitted from the communication terminal to the communication station via the radio communication network and determines a third identifier of at least one fourth relay terminal associated with the radio communication network, wherein the at least one fourth relay terminal is capable of relaying radio signals to the communication station that are transmitted by the communication terminal to the first relay terminal, wherein the management module also determines a fourth identifier of at least one fifth relay terminal associated with the radio communication network, wherein the at least one fifth relay terminal is capable of relaying radio signals to the first relay terminal that are transmitted by the communication terminal to the communication station via the first relay terminal, wherein the management module selects the at least one third relay terminal for relaying a first radio signal from the communication station to the first relay terminal, selects the at least one second relay terminal for relaying the first radio signal from the first relay terminal to the communication terminal, selects the at least one fourth relay terminal for relaying a second radio signal from the first relay terminal to the communication station, and selects the at least one fifth relay terminal for relaying the second radio signal from the communication terminal to the first relay terminal;

a transceiver module in operative communication with the management module to receive station data carried by the first radio signal directly from the communication station and from the communication station via the at least one third relay terminal and transmit the station data carried by the first radio signal from the first relay terminal directly to the communication terminal and from the first relay terminal to the communication terminal via the at least one second relay terminal, wherein the transceiver module also receives terminal data carried by the second radio directly from the communication terminal and from the communication terminal via the at least one fifth relay terminal and transmits the terminal data carried by the second radio signal from the first relay terminal directly to the communication station and from the first relay terminal to the communication station via the at least fourth relay terminal; and a processing module in operative communication with the transceiver module to combine the first radio signal received directly from the communication station and the first radio signal received from the at least one third relay terminal to produce a combined station signal that has increased energy in relation to the corresponding individual first radio signals received by the transceiver module, wherein the processing module also combines the second radio signal received directly from the communication terminal and the second radio signal received from the at least one fifth relay terminal to produce a combined terminal signal that has increased energy in relation to the corresponding individual second radio signals received by the transceiver module.

23. A communication station in a radio communication network and adapted to exchange data carried by radio signals with a communication terminal, the communication station comprising:

a management module to recognize outgoing data is to be transmitted to a communication terminal via a radio communication network and to determine an identifier of at least one relay terminal associated with the radio communication network, wherein the at least one relay terminal is capable of relaying radio signals transmitted by the communication station to the communication terminal, wherein the management module selects the at least one relay terminal for relaying a first radio signal from the communication station to the communication terminal;

a transceiver module in operative communication with the management module to transmit outgoing data carried by the first radio signal from the communication station directly to the communication terminal and from the communication station to the communication terminal via the at least one relay terminal, wherein the transceiver module also receives incoming data carried by a second radio signal directly from the communication terminal and from the communication terminal via one or more relay terminal; and a processing module in operative communication with the transceiver module to combine the second radio signal received directly from the communication terminal and the second radio signal received from the communication terminal via the one or more relay terminal to produce a combined signal that has increased energy in relation to the individual radio signals received by the transceiver module.

24. The communication station according to claim 23, wherein the first radio signal carrying the outgoing data transmitted directly to the communication terminal is transmitted via a communication satellite such that the communication satellite is capable of relaying the first radio signal from the communication station directly to the communication terminal and from the communication station to the communication terminal via the one or more relay terminal.

25. The communication station according to claim 23 wherein the second radio signal received directly from the communication terminal is received via a communication satellite such that a first portion of the second radio signals carrying the incoming data are received via the communication satellite and wherein one or more relay terminal from which the second radio signal carrying the incoming data are received relay the corresponding second radio signal from the communication terminal to the communication satellite such that a second portion of the second radio signals carrying the incoming data are received via the one or more relay terminal and the communication satellite.

* * * * *